United States Patent [19]
Uwabo et al.

[11] Patent Number: 5,831,794
[45] Date of Patent: Nov. 3, 1998

[54] FLEXIBLE DISK DRIVE HAVING HEAD CARRIAGE LOCKING MECHANISM

[75] Inventors: Tsuneo Uwabo; Yoshihiro Okano; Eiichi Yoneyama; Yoshinori Tangi; Teruo Shimazu; Toshiharu Shimizu; Yoshihide Majima; Toshimitsu Itoh, all of Atsugi, Japan

[73] Assignee: Mitsumi Electric Co., Ltd., Tokyo, Japan

[21] Appl. No.: 792,434

[22] Filed: Jan. 30, 1997

[30] Foreign Application Priority Data

Jan. 31, 1996 [JP] Japan ..................................... 8-015845
May 21, 1996 [JP] Japan ..................................... 8-125609

[51] Int. Cl.⁶ ............................. G11B 5/54; G11B 17/04; G11B 33/02
[52] U.S. Cl. ....................... 360/105; 360/99.06; 369/75.2
[58] Field of Search .................... 369/77.1–77.2, 369/75.1–75.2; 360/99.02, 99.06, 104–106

[56] References Cited

FOREIGN PATENT DOCUMENTS 2-46580  2/1990  Japan .
3-219474 9/1991  Japan ..................................... 360/105
4-61063  2/1992  Japan .

Primary Examiner—Allen T. Cao
Attorney, Agent, or Firm—Frishauf, Holtz, Goodman, Langer & Chick

[57] ABSTRACT

A flexible disk drive includes a magnetic head carriage, a linear motor for moving the carriage, and a carriage locking mechanism for locking the carriage in response to ejecting action of a flexible disk from the flexible disk drive. A lever unit has an ejecting lever and a locking lever. The ejecting lever is a part of an ejecting mechanism for ejecting the flexible disk from the flexible disk drive. The locking lever is disposed in the vicinity of the carriage, and locks the carriage from movement after the flexible disk is ejected from the flexible disk drive by the ejecting lever. The lever unit is made of non-magnetic material such as resin as one body.

4 Claims, 3 Drawing Sheets

FLEXIBLE DISK DRIVE HAVING HEAD CARRIAGE LOCKING MECHANISM

BACKGROUND OF THE INVENTION:

This invention relates to a flexible disk drive and, in particular, to a locking mechanism of a carriage supporting a magnetic head in such a flexible disk drive.

As is well known in the art, flexible disk drives are devices which carry out recording and reproducing of data to flexible disks. In recent years, the storage capacity of the flexible disks has become larger, and has been developed from 1–2 megabytes (this is referred to as ordinary capacity hereafter) to 128 megabytes (this is referred to as large capacity hereafter). Flexible disk drives for the large capacity flexible disks have also been developed along with the advances in the storage capacity of the flexible disks.

Hereafter, a type of the flexible disk drive which is exclusively used for recording and reproducing data to the large capacity flexible disks will be called a high density exclusive type disk drive. Another type of the flexible disk drive which is exclusively used for recording and reproducing data to the ordinary capacity flexible disks will be called an ordinary density exclusive type disk drive. And still another type of the flexible disk drive which can carry out recording and reproducing of data to both large capacity flexible disks and ordinary capacity flexible disks will be called a common type disk drive. The high density exclusive type and the common type disk drive will collectively be called a high density type disk drive.

A mechanical difference between flexible disk drives of the ordinary density type and the high density type is in an actuating device for moving a carriage supporting a magnetic head along a predetermined radial direction of the flexible disk inserted into the flexible disk drive. The carriage supporting a magnetic head will simply be referred to as carriage.

Usually, the flexible disk drive of the ordinary density exclusive type uses a stepping motor for the actuating device, while the high density type uses a linear motor such as a voice coil motor (VCM) for the actuating device.

The voice coil motor has a pair of voice coils which are arranged at both sides of a rear portion of the carriage and are wound around actuating shafts extending in parallel with the predetermined radial direction of the flexible disk inserted, and a pair of magnetic circuits which generates a magnetic field intersecting electric current flowing through the voice coils. When the electric current is supplied to flow through the voice coils, an actuating power is generated to the direction of the actuating shafts due to the mutual action between the electric current and the magnetic field intersecting with each other. Thus, the voice coil motor moves the carriage along the predetermined radial direction by the actuating power.

The flexible disk drive is often transferred, displaced or carried from one place to another place. During the carrying, the carriage tends to move in response to a shock applied to the flexible disk drive carried. Therefore, it is desired to keep the carriage stationary or to lock the carriage in place, even if the flexible disk drive is moved and shocked.

In the flexible disk drive of the ordinary density exclusive type, the carriage is kept stationary by a reed screw of the stepping motor used therein. In other words, the stepping motor functions as a locking mechanism for the carriage.

However, the linear motor such as the voice coil motor used in the high density type has no locking mechanism and therefore, the carriage freely moves in a predetermined radial direction in a condition where the voice coil is not energized. Accordingly, the high density type flexible disk drive has a disadvantage that the carriage readily moves by movement of the flexible disk drive and tends to be broken down by mechanical shock. Therefore, the high density type flexible disk drive is loaded with a dummy diskette therein just before it is moved from one place to another, so as to keep the carriage stationary during movement of the flexible disk drive. However, the use of the dummy diskette is troublesome for users of the flexible disk drive.

SUMMARY OF THE INVENTION:

It is, therefore, an object of this invention to provide a flexible disk drive which can lock a carriage supporting a magnetic head in response to ejection of a flexible disk therefrom.

According to this invention, there is provided a flexible disk drive for recording and reproducing, by use of a magnetic head, data to a flexible disk loaded thereinto, which comprises a carriage supporting the magnetic head, an ejecting mechanism for ejecting the flexible disk from the flexible disk drive, and a carriage locking mechanism interlocking with the ejecting mechanism for locking the carriage from movement after ejection of the flexible disk.

Figure 1:
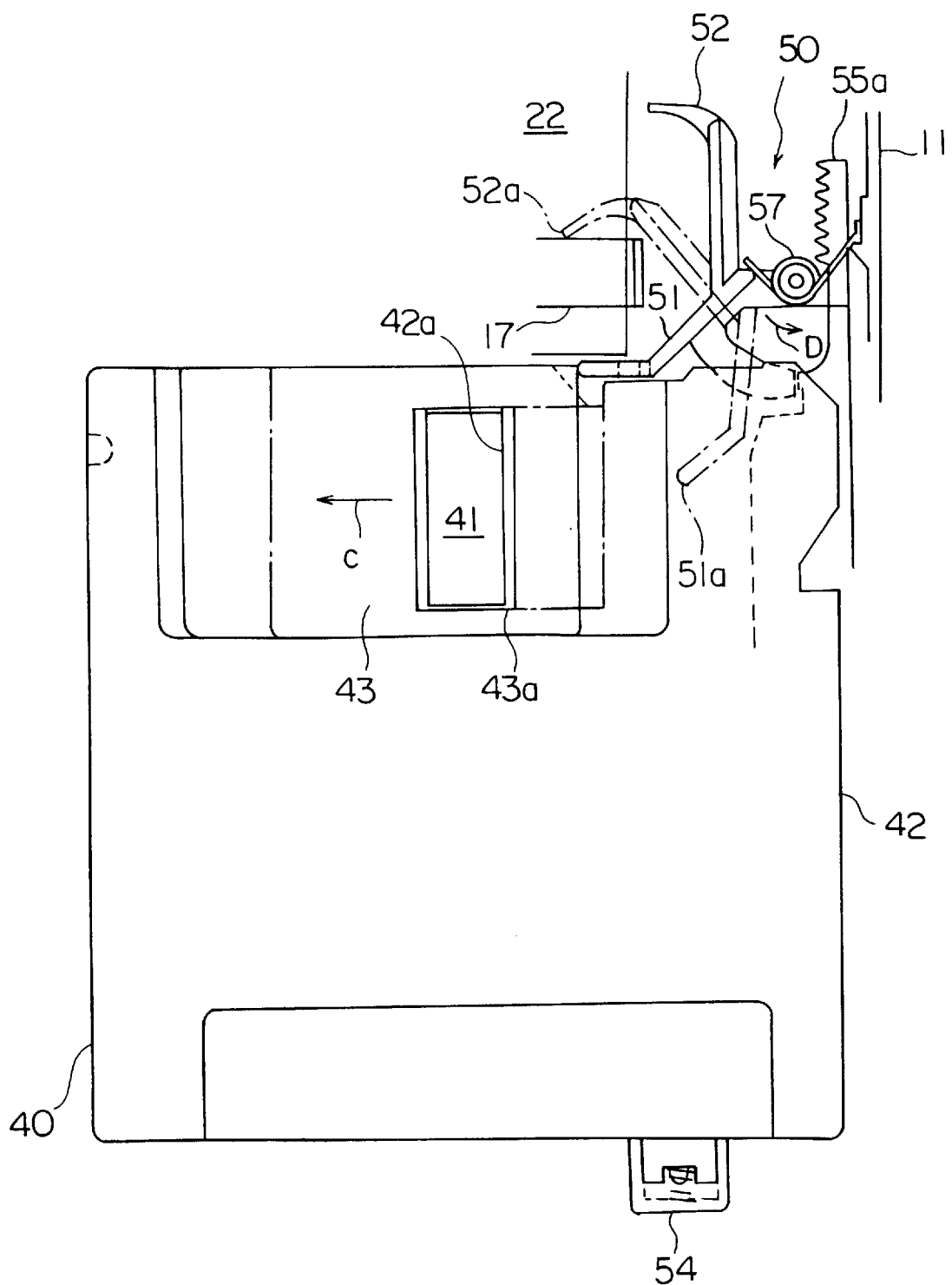
FIG. 1 is a plan view of a carriage locking mechanism in a flexible disk drive according to an embodiment of this invention and a flexible disk.
Figure 2:
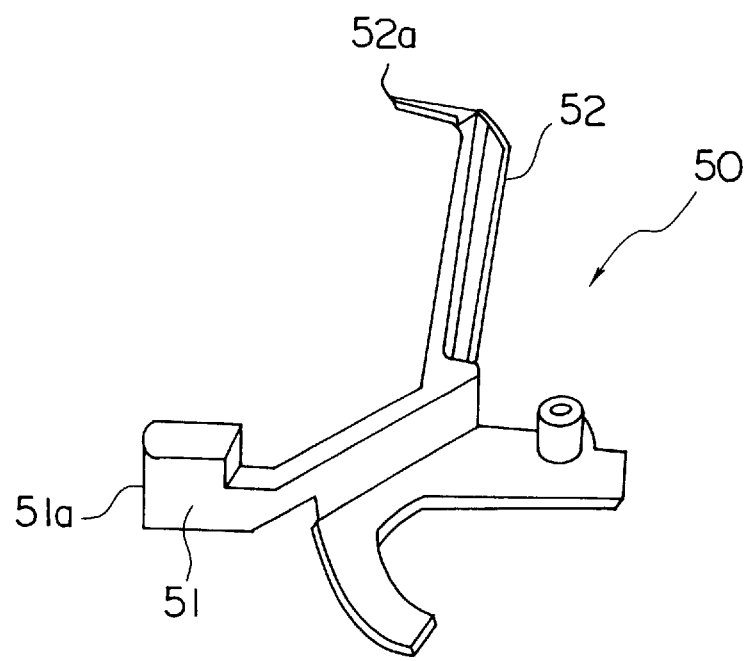
FIG. 2 is a perspective view of a lever unit in FIG. 1.
Figure 3:
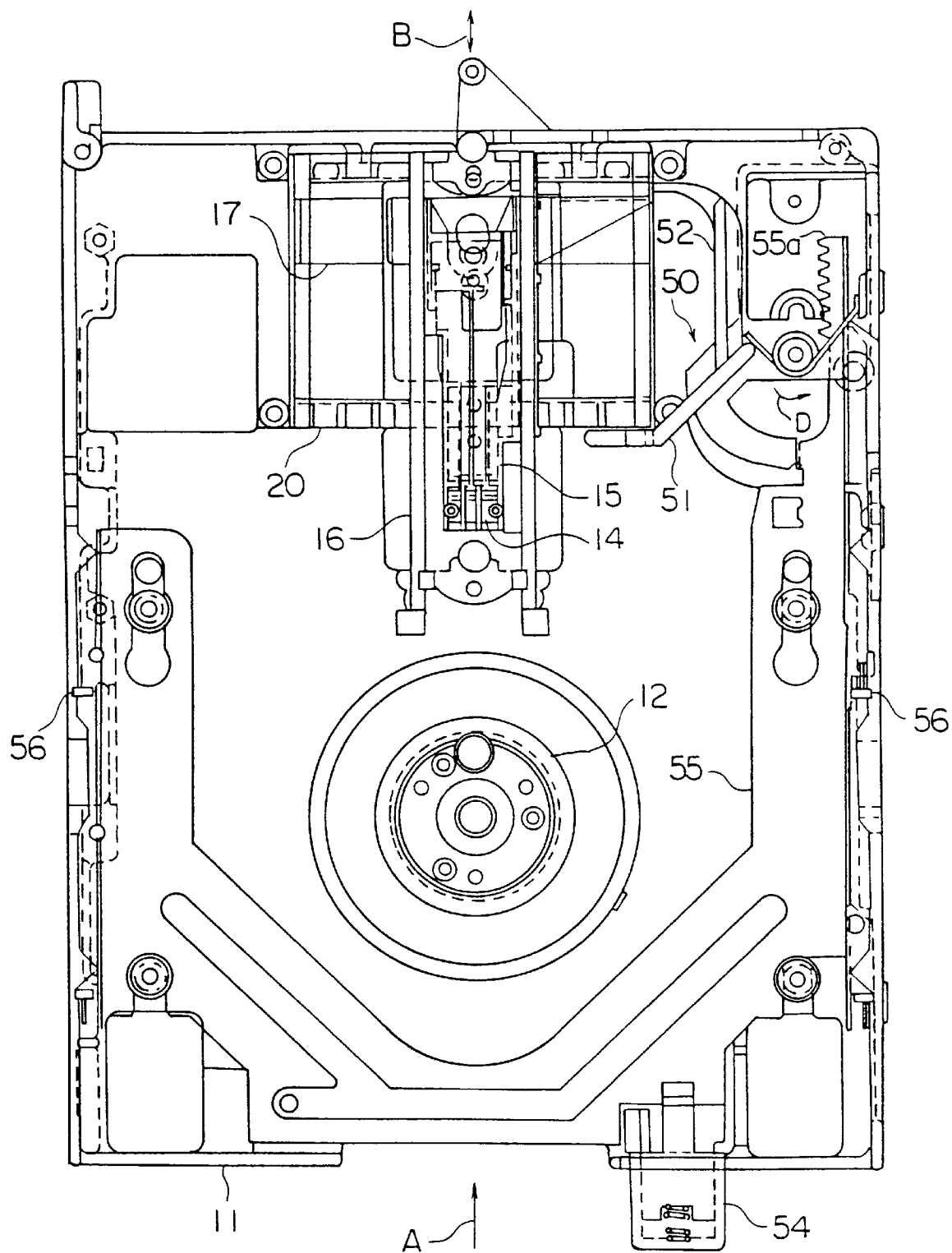
FIG. 3 is a plan view of a flexible disk drive having a carriage locking mechanism according to an embodiment of this invention.

DESCRIPTION OF THE PREFERRED EMBODIMENT:

Referring now to FIGS. 1 to 3, the description will proceed to a flexible disk drive according to a preferred embodiment of this invention.

The flexible disk drive shown in FIG. 3 is a device which carries out recording and reproducing of data to flexible disks. A flexible disk is inserted or loaded into the flexible disk drive from the direction shown by an arrow A in FIG. 3. The inserted flexible disk is maintained on a disk table assembly 12 which is rotatably supported on a surface of a main frame 11. Thereupon, a center axis of the inserted flexible disk is coincident with that of the disk table assembly 12. The disk table assembly 12 is rotated by a driving motor (not shown) which is arranged at the rear side of the main frame 11. The inserted flexible disk rotates in accordance with rotation of the disk table assembly 12. A printed circuit board (not shown) having many electronic parts is installed at the rear side of the main frame 11.

The flexible disk drive has a magnetic head (not shown) which carries out reading and writing of data to the flexible disk. The magnetic head is supported by a carriage 15 through a gimbal 14. An assembly of the magnetic head, the gimbal 14, the carriage 15, a pair of voice coils 17, a FPC (flexible printed circuit) (not shown), a scale (not shown), a spring holder (not shown), and a spring (not shown) is referred to as a carriage assembly. The carriage 15 is arranged on the surface of the main frame 11 and apart therefrom. The carriage 15 supports and moves the magnetic head in a predetermined radial direction (the direction shown by an arrow B in FIG. 3) of the flexible disk.

The carriage 15 is supported and guided by a pair of guide bars 16 which are arranged parallel to the predetermined radial direction B.

The carriage 15 is driven along the predetermined radial direction B by a voice coil motor. The voice coil motor has the voice coils 17 which are mounted on both sides of a rear portion of the carriage 15 and are wound around actuating shafts extending in parallel with the predetermined radial direction B, and a pair of magnetic circuits for generating a magnetic field which intersects with an electric current flowing through the voice coils 17. When the electric current is supplied to flow through the voice coils 17, an actuating power is generated in the direction of the actuating shafts due to the mutual action between the electric current and the magnetic field intersecting with each other. Thus, the voice coil motor moves the carriage 15 along the predetermined radial direction B by the actuating power.

FIG. 1 shows a state which a flexible disk 40 is inserted into the flexible disk drive shown in FIG. 3.

The flexible disk 40 has a magnetic disk medium 41, a case 42 covering the magnetic disk medium 41, and a shutter 43 slidable in the direction of an arrow C. The case 42 has an opening 42a, and the shutter 43 has a window 43a. The shutter 43 is biased by a spring (not shown) in the reverse direction of the arrow C. When the shutter 43 slides in the direction of the arrow C, the window 43a is situated at the opening 42a as shown in FIG. 1. The magnetic head can access the magnetic disk medium 41 through the opening 42a.

The flexible disk drive has a shutter actuating mechanism which opens and shuts the shutter 43, an ejecting mechanism which ejects the flexible disk 40 from the flexible disk drive, and a carriage locking mechanism which locks the carriage 15 after ejection of the flexible disk 40.

Referring to FIG. 2, a lever unit 50 has an ejecting lever 51 and a locking lever 52. The ejecting lever 51 is served both as a part of the shutter actuating mechanism and a part of the ejecting mechanism. The locking lever 52 is arranged in the vicinity of the carriage 15, and locks the carriage 15 when the flexible disk 40 is ejected from the flexible disk drive by the ejecting lever 51.

The lever unit 50 is made of a metal such as steel, aluminum or aluminum alloy as a single body by casting, but, preferably, non-magnetic material such as plastic resin as a single molded body.

The ejecting mechanism has an ejecting button 54 which protrudes from a surface of a front panel (not shown) in the flexible disk drive, an ejecting plate 55 having a surface for positioning the flexible disk 40 inserted from an inlet (not shown) of the front panel to face the surface, and an ejecting spring 56 having an end which engages with the ejecting plate 55 and the other end which engages with a disk holder unit (not shown). The ejecting plate 55 has a rack 55a at an end portion, which rack 55a engages with a pinion (not shown) rotatably supported on the surface of the main frame 11.

Before the flexible disk 40 is inserted into the flexible disk drive, the lever unit 50 is situated at a position shown by a chain line in FIG. 1. The position of the lever unit 50 is regulated by the disk holder unit. In this state, the lever unit 50 is biased by a spring mechanism 57 in the counterclockwise direction shown an arrow D.

It is now provided that the flexible disk 40 is inserted into the flexible disk drive in this state. Namely, when the flexible disk 40 is inserted into the flexible disk drive in the direction shown by the arrow A in FIG. 3, a top end 51a of the ejecting lever 51 engages with a right side corner of the shutter 43. When the flexible disk 40 is further inserted into the flexible disk drive, the lever unit 50 rotates in the clockwise direction. Thereupon, the shutter 43 is slid by the top end 51a of the ejecting lever 51 in the direction shown by the arrow C.

When the flexible disk 40 is completely accommodated into the flexible disk drive, the flexible disk 40 is supported into the disk holder unit by a disk locking mechanism (not shown). In this state, the window 43a (prepared at the opposite position at the rear side) of the shutter 43 is situated just above the opening 42a of the case 42. And, the shutter 43 is biased by a spring (not shown) so as to be situated at the position shown by another imaginary line in FIG. 1.

Next, it is provided that the ejecting bottom 54 is pushed down in order to eject the flexible disk 40 from the flexible disk drive in this state. Thereupon, the flexible disk 40 is released from locking by the disk locking mechanism. Namely, when the lever unit 50 releases the ejecting plate 55, the disk holder unit is lifted up. The flexible disk 40 is partially ejected from the flexible disk drive by the ejecting lever 51 biased by the spring mechanism 57, and the flexible disk 40 can manually be drawn out from the disk holder unit.

At this moment, the locking lever 52 is rotated by the spring mechanism 57 in the counterclockwise direction shown by the arrow D and locks the carriage 15 simultaneously. In detail, a top end 52a of the locking lever 52 moves the carriage 15 towards a center of the flexible disk 40, and engages with the voice coil 17. Movement of the carriage 15 towards the center of the flexible disk 40 is previously limited at a predetermined position, and the carriage 15 can not move to the center of the flexible disk 40 beyond the predetermined position. Thus, the carriage 15 is thus locked and prevented from moving in the flexible disk drive, even if the flexible disk drive is shocked.

In the above-mentioned embodiment of this invention, when the flexible disk is inserted into the flexible disk drive, the carriage 15 is always positioned near the center of the flexible disk 40 at the locking condition. Therefore, the torque of the driving motor for driving the magnetic disk can be reduced at a start of the recording or reproducing operation, because the magnetic head is in contact with the magnetic disk near the rotating center of the magnetic disk. Further, as the lever unit 50 comprises of the locking lever 52 and the ejecting lever 51 as one body, the number of parts is decreased.

Needless to say, this invention is not limited to the above-mentioned embodiment, and the embodiment can be modified in various manners within the substantial scope of this invention. For instance, within the scope of this invention it is possible that the carriage 15 is locked at a position remotely away from the center of the flexible disk 40.

What is claimed is:

1. A flexible disk drive comprising:

a carriage supporting a magnetic head;

an ejecting mechanism for ejecting a flexible disk;

a carriage locking mechanism interlocking with said electing mechanism for locking said carriage from movement at a predetermined position near a center of said flexible disk after an election of said flexible disk; and a linear motor for driving said flexible disk so as to record data on and reproduce data from said flexible disk;

wherein said carriage locking mechanism comprises a locking lever arranged in a vicinity of said carriage and a spring mechanism which biases said locking lever towards said carriage, said locking lever being situated apart from said carriage when said flexible disk is inserted into said flexible disk drive, and said locking lever locking said carriage when said locking lever moves said carriage towards the center of said flexible disk due to a spring force exerted by said spring mechanism, and wherein said linear motor comprises coils mounted onto said carriage to form a carriage assembly, and said locking lever has a top end engaging with said carriage assembly when said ejecting mechanism is operated.

2. A flexible disk drive comprising:

a carriage supporting a magnetic head;

an ejecting mechanism for ejecting a flexible disk;

a carriage locking mechanism interlocking with said electing mechanism for locking said carriage from movement at a predetermined position near a center of said flexible disk after an ejection of said flexible disk; and a linear motor for driving said flexible disk so as to record data on and reproduce data from said flexible disk;

wherein said carriage locking mechanism comprises a locking lever arranged in a vicinity of said carriage and a spring mechanism which biases said locking lever towards said carriage, said locking lever being situated apart from said carriage when said flexible disk is inserted into said flexible disk drive, and said locking lever locking said carriage when said locking lever moves said carriage towards the center of said flexible disk due to a spring force exerted by said spring mechanism, and wherein said ejecting mechanism comprises an ejecting lever, and said locking lever is integrally formed with said ejecting lever in a single body.

3. A flexible disk drive as claimed in claim 2, wherein both said locking lever and said ejecting lever are made of a non-magnetic material.

4. A flexible disk drive as claimed in claim 3, wherein said non-magnetic material comprises resin.

* * * * *